United States Patent
Campau

(10) Patent No.: US 7,670,521 B2
(45) Date of Patent: Mar. 2, 2010

(54) METHOD AND APPARATUS FOR THE MANUFACTURE OF CONDUIT WITH ASSEMBLED COMPONENTS AND CONDUIT ASSEMBLY MADE THEREFROM

(75) Inventor: Daniel N. Campau, S.E. Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 222 days.

(21) Appl. No.: 11/396,343

(22) Filed: Mar. 31, 2006

(65) Prior Publication Data

US 2007/0228725 A1 Oct. 4, 2007

(51) Int. Cl.
*F16L 41/00* (2006.01)

(52) U.S. Cl. .................. 264/197; 264/154; 264/248; 264/280; 264/293; 264/507; 264/508; 264/36.16

(58) Field of Classification Search .................. 264/154, 264/248, 280, 293.1, 507, 508, 36.16; 285/197
See application file for complete search history.

(56) References Cited

U.S. PATENT DOCUMENTS

| | | | | | |
|---|---|---|---|---|---|
| 3,104,464 | A | * | 9/1963 | Frink | ............... 29/566 |
| 3,229,721 | A | | 1/1966 | Bingel | |
| 3,501,939 | A | * | 3/1970 | Remus et al. | ............... 72/343 |
| 3,940,834 | A | | 3/1976 | Lajovic | |
| 3,977,708 | A | | 8/1976 | Jopp | |
| 4,093,694 | A | * | 6/1978 | Browning | ............... 264/246 |
| 4,158,534 | A | * | 6/1979 | Hegler et al. | ............... 425/142 |
| 4,211,741 | A | | 7/1980 | Ostoich | |
| 4,316,870 | A | * | 2/1982 | Rowley | ............... 264/296 |
| 4,446,084 | A | | 5/1984 | Rowley | |
| 4,479,678 | A | | 10/1984 | Sharp | |
| 4,545,751 | A | | 10/1985 | Lupke | |
| 4,564,487 | A | | 1/1986 | Bennett | |
| 4,765,121 | A | | 8/1988 | Konstantin | |
| 5,063,018 | A | | 11/1991 | Fontirroche | |
| 5,284,176 | A | * | 2/1994 | Campau | ............... 137/260 |
| 5,392,626 | A | | 2/1995 | Blezard | |
| 5,496,164 | A | | 3/1996 | Czarnik | |
| 5,904,803 | A | | 5/1999 | Hillerich | |
| 6,240,820 | B1 | | 6/2001 | Sturrus | |
| 6,280,554 | B1 | | 8/2001 | Lambert | |
| 6,784,407 | B2 | | 8/2004 | Wright | |

FOREIGN PATENT DOCUMENTS

| EP | 0491115 A | 6/1992 |
|---|---|---|
| EP | 0970602 A | 1/2000 |

OTHER PUBLICATIONS

European Search Report, Apr. 16, 2008.

\* cited by examiner

*Primary Examiner*—Christina Johnson
*Assistant Examiner*—Magali P Théodore
(74) *Attorney, Agent, or Firm*—Niro, Scavone, Haller & Niro

(57) ABSTRACT

A method and apparatus for performing a manufacturing operation at a plurality of locations along the length of a previously fabricated flexible conduit. The apparatus comprises a driving mechanism, a manufacturing station, and a support device. The conduit is first fed through the manufacturing station. The manufacturing station then performs the manufacturing operation at a plurality of locations along the length of the conduit. The support device within the conduit is not attached to any other structure and provides structural support at the manufacturing station during the manufacturing operation and remains at a generally fixed axial and functional location while the conduit continues to move axially.

7 Claims, 3 Drawing Sheets

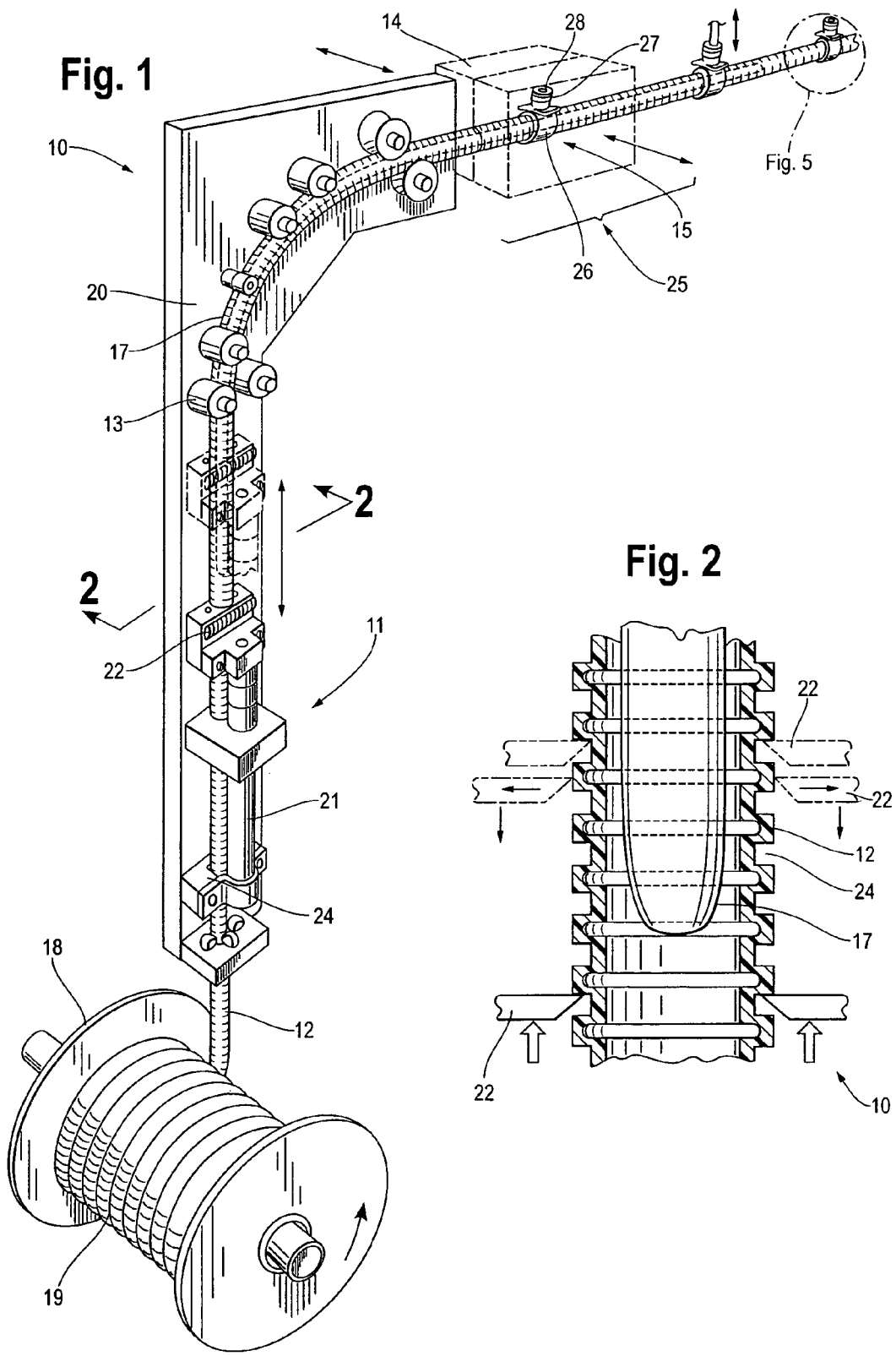

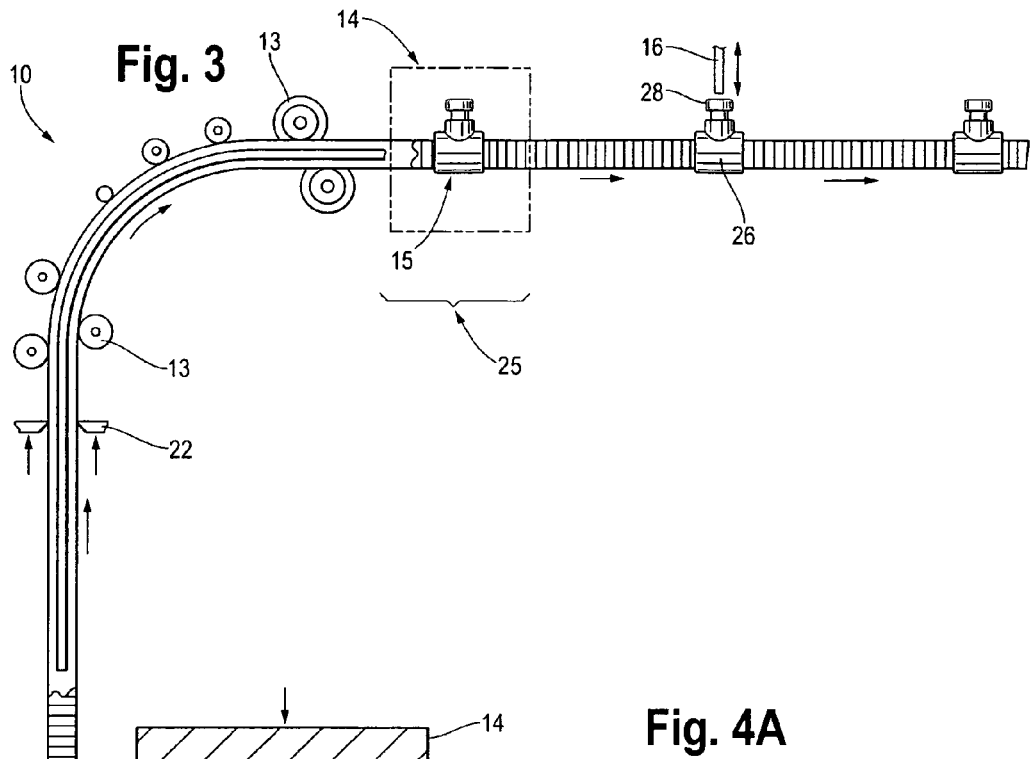
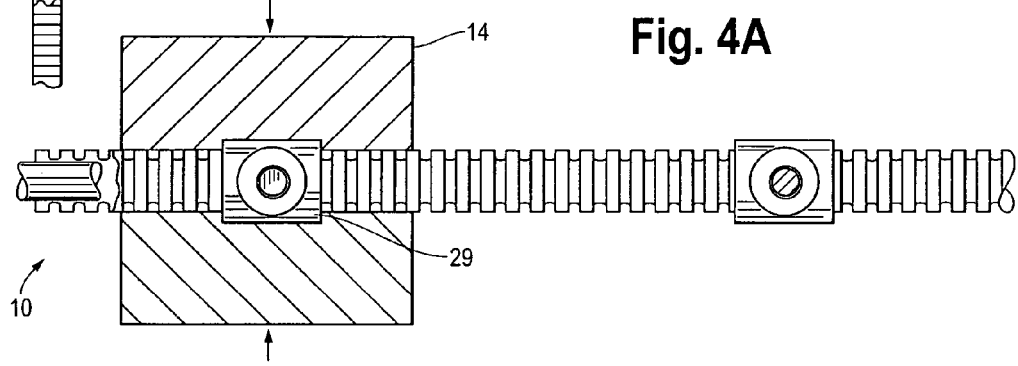
Fig. 4A
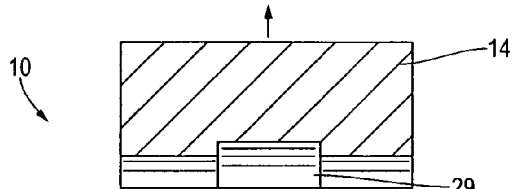
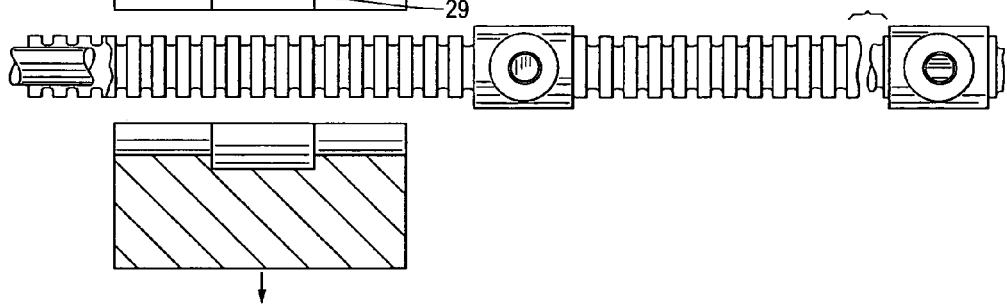
Fig. 4B

METHOD AND APPARATUS FOR THE MANUFACTURE OF CONDUIT WITH ASSEMBLED COMPONENTS AND CONDUIT ASSEMBLY MADE THEREFROM

BACKGROUND OF THE INVENTION

The present invention is directed generally to the field of flexible conduits, typically relatively long lengths of conduits, and more particularly to methods and apparatus for performing various fabrication operations at spaced intervals along the length of such flexible conduits. The present invention is also directed to the flexible conduit assemblies manufactured through the use of the method and apparatus. The invention finds application in the manufacture of flexible plastic tubing assemblies used in a variety of fields, including, for example, single point battery watering systems.

Flexible conduits are used in many specialized applications. For instance, flexible conduits may be used in sprinkler systems, irrigation systems, and air pumps. Flexible conduits may also be used in single point watering (SPW) systems to supply battery cells with fluids. In such systems, a single conduit or tube supplies fluids to a plurality of interconnected tubes. Each tube in turn supplies fluids to a plurality of battery cell refill valves.

Conventional flexible conduits are generally fabricated by plastic molding. However, for many specialized applications, conduits must be further modified after initial fabrication. For instance, in single point battery watering systems, each conduit or tube in a tubing network must be fitted with a plurality of inserts or fittings that can connect and supply fluids to battery cell refill valves. Likewise, tubes in sprinkler systems must be fitted with a plurality of fittings that can connect to sprinklers. In other systems, there may be a desire to aesthetically modify tubes by embossing, engraving or hot stamping them with displays such as commercial logos.

The modification of flexible conduits for various applications is challenging because the tubing is susceptible to folding and collapsing under pressure. Thus, any modification that requires the application of force to the tubing wall may affect a tube's structural integrity or lead to poor results. For instance, a tube may fold during a drilling process and result in the formation of multiple apertures at undesired places. Likewise, a tube may collapse during embossing such that the embossed structure is not properly positioned. In other instances, more rigid tubes may crack or break during a modification step. Therefore, there is a need for a method and apparatus to provide internal structural support to a conduit to prevent collapse during operations on the wall of the conduit at periodic intervals. The present invention addresses this unmet need.

The innovative conduit assembly of the present invention facilitates the installation of fluid distribution systems by prefabricating the conduit and fittings or other components prior to the time of installation. For example, in the case of single point battery watering systems, the fittings are prefabricated and joined to the conduit so that the finished assembly may be installed on the battery with little or no cutting and connecting of the conduit assembly in the field. The same installation advantages arise in a variety of other fields, such as lawn irrigation or patio misting systems.

SUMMARY OF INVENTION

The present invention provides a method and apparatus for performing a manufacturing operation at a plurality of locations along the length of a flexible conduit with a longitudinally extending sidewall that defines an enclosed inner cavity. The apparatus of the present invention comprises a driving mechanism that engages the conduit and feeds it along a predetermined travel path. The apparatus of the present invention also comprises a manufacturing station that is positioned along the conduit travel path and adapted to assemble the manufactured component to the conduit at a plurality of locations along its length. In addition, the apparatus of the present invention comprises a support device that is positioned within the conduit at a point along the length of the conduit that is coincident with the manufacturing station, and wherein the support device remains in position as the conduit continues to move along its path of travel and through the manufacturing station.

In the first step of the manufacturing method of the present invention, the conduit is fed through the manufacturing station. The manufacturing station is then operated periodically to perform the manufacturing operation at a plurality of locations along the length of the conduit. During the manufacturing operation, the support device located within the conduit maintains the integrity of the conduit and provides structural support.

In the preferred embodiment of the present invention, the manufacturing apparatus utilizes a pneumatic valve driving mechanism. In addition, the preferred manufacturing apparatus of the present invention utilizes a floating mandrel as the support device. Furthermore, in the preferred embodiment, the manufacturing station comprises an injection molding machine for molding multiple fittings onto the conduit. The preferred manufacturing station also contains a wall piercing device for introducing apertures into the conduit.

In the preferred method of the present invention, the pneumatic valve feeds the conduit to the manufacturing station. The fittings are then injection molded onto the conduit at periodic intervals. Next, a piercing tool introduces holes into the conduit by accessing the conduit through apertures molded into the fittings. During the process, the floating mandrel within the conduit provides internal structural support.

The preferred conduit assembly of the present invention comprises a length of flexible conduit, generally a relatively long conduit body ranging from a few to many linear feet in length. A plurality of fittings or other manufactured components are integrally preassembled to and preferably molded onto the conduit body, with the manufactured components being positioned at spaced locations along the length of the conduit body. Typically, the individual components are spaced to accommodate the particular operating system in which the conduit assembly is used.

BRIEF DESCRIPTION OF THE DRAWINGS

The novel features which are characteristic of the present invention are set forth in the appended claims. However, the invention's preferred embodiments, together with further objects and attendant advantages will be best understood by reference to the following detailed description taken in connection with the accompanying drawings in which:

FIG. 1 is a perspective view of one embodiment of the manufacturing apparatus of the present invention.

FIG. 2 is an enlarged cross sectional view of a portion of the apparatus shown in FIG. 1.

FIG. 3 is a side view of the manufacturing apparatus in FIG. 1.

FIG. 4A is a top view of the manufacturing station in FIG. 3 during a molding operation.

FIG. 4B is a top view of the manufacturing station in FIG. 3 between molding operations.

DETAILED DESCRIPTION OF THE PREFERRED EMBODIMENTS

Figure 5:
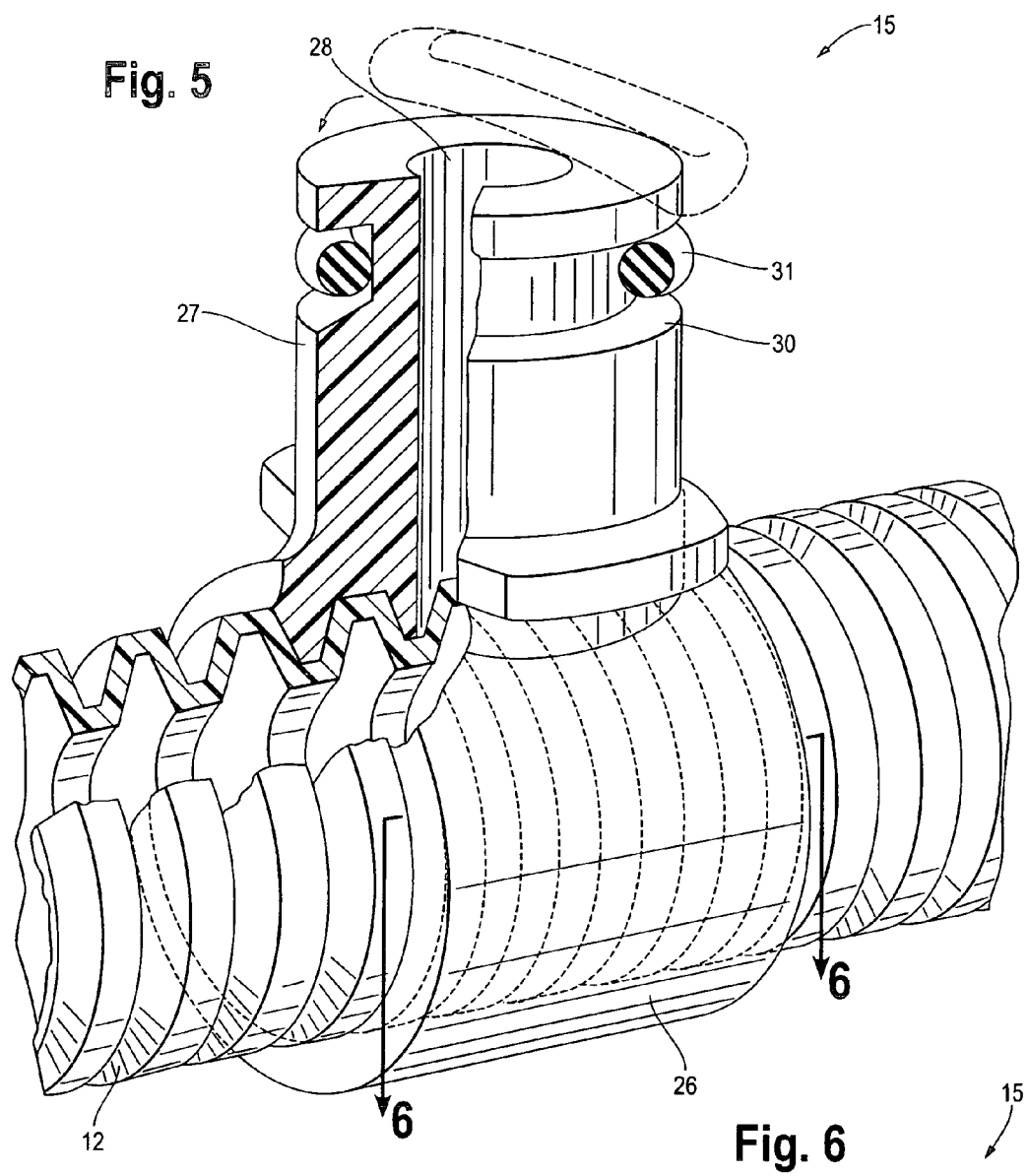
FIG. 5 is an enlarged and partial cross sectional view of the manufactured component in the form of a fitting as assembled to a conduit in the practice of the present invention.

FIG. 1 shows the preferred embodiment of the manufacturing apparatus of the present invention. In this embodiment, manufacturing apparatus 10 comprises a driving mechanism 11 with one or more cylinders 21 for feeding conduit 12 into the apparatus. Manufacturing apparatus 10 is also provided with support device 17 for supporting the conduit's sidewall and maintaining its integrity during the manufacturing process. Manufacturing apparatus 10 also comprises a plurality of restraints 13 for restraining the axial movement of support device 17. Restraints 13 also hold and guide the conduit through a predetermined path of travel.

In the preferred embodiment, a manufacturing station 25 comprises an injection molding machine 14 for molding a plurality of fittings 15 around the conduit. Manufacturing station 25 may also include a piercing tool, such as heated pin 16, for introducing a plurality of holes into the conduit. It is also desirable that manufacturing apparatus 10 comprise feed reel 18 for supplying conduit 12 and a frame or base 20 for mounting various components of the apparatus.

As shown in FIG. 2, it is desirable that conduit 12 be a flexible and hollow tube or corrugated conduit with a plurality of annular recesses grooves 24. It is also desirable that conduit 12 be composed of a plastic, such as polypropylene or polyurethane. However, in other embodiments, conduit 12 may be composed of other relatively flexible material.

In one preferred embodiment, driving mechanism 11 utilizes a pneumatic valve driver that reciprocates to move the conduit along its predetermined path of travel. As shown in FIG. 2, it is desirable that cylinder 21 operates a plurality of grippers 22 that engage recesses 24 on conduit 12. The grippers 22 may be spring biased to feed conduit 12 into manufacturing station 25 during the forward or driving stroke of driving mechanism 11.

In the preferred embodiment, the driving mechanism 11 feeds conduit 12 by intermittent motion. In other embodiments, conduit 12 may fed into the apparatus by continuous motion. In further embodiments, driving mechanism 11 may be an alternative mechanical structure, such as motor driven rollers or geared driving wheels. In other embodiments, an operator may manually feed conduit 12 into manufacturing apparatus 10.

Turning again to FIG. 1, it is shown that support device 17 is an elongated rod with a right angle bend. It is located within the inner cavity of conduit 12 and spans the path of travel of the conduit from the driving mechanism to the manufacturing station 25. Due to its right angle structure and its orientation relative to restraints 13, support device 17 does not move substantially within conduit 12 as the conduit itself moves. In particular, first restraints 13a prevent vertical movement of the support device, while restraints 13b prevent horizontal movement of the support device. Other mechanical restraints that will maintain the axial location of the support device relative to the manufacturing station 25 apparent to those of skill in the art.

Support device 17 is a floating mandrel. Floating mandrels have been used for molding tubes from molten plastic. Floating mandrels have also been used to expand flattened tubes. However, floating mandrels have not been used to provide internal structural support to conduit or tubes of significant length during a manufacturing process. Such a use for a floating mandrel has not been disclosed or suggested in the art prior to this invention.

Support device 17 is preferably an inflexible plastic or metal and is provided with a generally tapered tip. It is desirable that support device 17 be comprised of or coated with a high lubricity material, such as polytetrafluoroethylene. Most preferably, support device 17 is provided with a cross sectional geometry most suited for supporting the sidewall of the conduit during the manufacturing operation. Other embodiments of support device 17 that are suitable for the present invention are disclosed in U.S. Pat. Nos. 3,104,464, 4,765,121, 5,063,018, and 5,392,626. The disclosures of these patents are incorporated into this application by reference.

The preferred method of performing the manufacturing operation of the present invention is illustrated in FIGS. 1 and 3. In the first step of the preferred method, the forward or free end of conduit 12 is inserted into aperture 24 on driving mechanism 11. Next, driving mechanism 11 is operated to feed conduit 12 into manufacturing station 25. During the feeding of the conduit 12 toward the manufacturing station 25, the conduit passes over the first or near end of the support device. In this manner, the conduit is treaded over the support device and is supported by it in the manufacturing station. The conduit is directed along it path of travel to manufacturing station 25 by restraints 13. Once the conduit reaches the manufacturing station, injection molding machine 14 forms the fitting 15 over the conduit. In the preferred embodiment, the fitting 15 is molded from the same plastic material as used in fabrication of the conduit 12. As a result, the fittings are integrally joined to and fully sealed with the conduit since during the molding operation at least a portion of the conduit sidewall becomes molten and fully cures with the injected plastic forming the fitting. Fitting 15 includes a body 26 and top 27 with an aperture 28. Next, the molded fitting reaches the area of the manufacturing station where the piercing tool 16, which is preferably a heated metal pin, then forms an aperture in the sidewall of conduit 12. As the conduit exits the manufacturing station 25, it passes off the support device's second or far end, since the support device is prevented from moving with the conduit by restraints 13.

The manufacturing cycle is repeated at periodic intervals as conduit 12 passes through manufacturing station 25. As a result, conduit 12 is molded with a plurality of fittings 15. During this process, support device 17 remains in conduit 12 at the manufacturing station 25 and provides internal structural support. The resulting prefabricated conduit assembly may be of a length ranging from just several inches to as much as fifty to several hundred feet, and may be wound on a reel for ease of shipment and handling.

As shown in FIG. 5, the molded fitting comprises a top 27 and an aperture 28. Aperture 28 generally serves to provide access to conduit 12. Likewise, top 27 generally serves as an insert for the connection of conduit 12 to secondary structures, such as battery cell refill valves. To provide a sealing mechanism for such connections, top 27 may further comprise recess 30, where o-ring 31 may be inserted.

Figure 6:
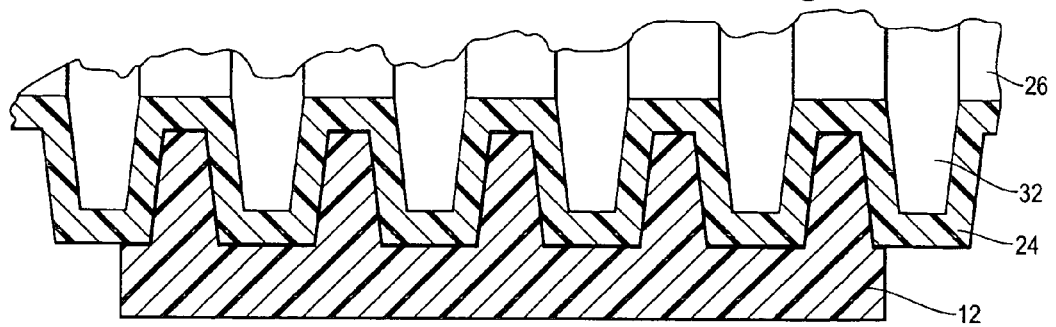
FIG. 6 is an enlarged partial cross-sectional view taken along line 5-5 in FIG. 5.

As illustrated in FIG. 6, fitting 15 also comprises body 26 surrounding conduit 12. Body 26 is sealed tightly around conduit 12 by a plurality of protrusions 32 that are in tight contact with grooves 24 on conduit 12. As discussed above, where the fitting and the conduit are made from the same or compatible plastic materials, they will tend to fuse into an integral assembly during the injection molding of the fitting.

In the preferred embodiment, the manufacturing apparatus and method of the present invention may be used to produce tubing networks for use in single point battery watering systems. In this embodiment, fittings 15 serve as inserts for connection to a plurality of refill valves. In addition, conduits 12 may be interconnected to one another by a plurality of connectors. Examples of such tubing networks are described in detail in U.S. Pat. Nos. 5,832,946, 5,284,176, 5,482,794, and 5,453,334. The disclosures of these patents are hereby incorporated by reference. When used in a single point battery watering system, the conduit is preferably of a length sufficient to accommodate the installation of the conduit assembly to one or more batteries or at least to a significant subset of the battery, and the fittings 15 are spaced along the length of the conduit to correspond to the spacing of the refill valves positioned in each of the battery cells. This will typically call for the fittings 15 to be spaced from about two to ten inches along the conduit length. The prefabricated conduit assembly is installed into the battery watering system simply by pressing the fittings onto the cell refill valves, without the need for cutting the conduit and connecting the individual fittings in the field. End caps or plugs may be used to block the free ends of the conduit assembly or any unused fittings. This installation technique provides substantial labor and time savings over conventional systems.

It is to be understood that there are various embodiments of the present invention. For instance, in one embodiment, a nozzle may be molded onto the conduit. In other embodiments, fitting 15 may be absent from conduit 12. In such embodiments, pin 16 may access conduit 12 directly. In other embodiments, pin 16 may be a needle or a drill instead of a heated pin. In further embodiments, the manufacturing station may contain a heated block or plate for thermoforming, hot stamping, engraving, or embossing conduit 12 at periodic intervals. In other embodiments, multiple pins or plates may be present at the manufacturing station.

As apparent by the multiple embodiments, the present invention may be used to produce tubing networks for a variety of applications. For instance, the apparatus and method of the present invention may be used to manufacture sprinkler systems. The present invention may also be used to produce tubes with engraved logos, trademarks, or other displays. In further embodiments, the present invention may be used to produce tubing networks for use in irrigation systems and air pumps. Such tubing networks could be manufactured by various methods, such as blind riveting, drilling, piercing, embossing and thermoforming.

There are other numerous embodiments of the present invention which, while not expressly described above, are clearly within the scope and spirit of the invention. The above description is therefore intended to be exemplary only and the scope of the invention is to be determined solely by the appended claims.

The invention claimed is:

1. A method for performing a manufacturing operation at a plurality of locations along the length of a flexible conduit to thereby fabricate a conduit assembly, the method comprising:
   providing a length of previously fabricated flexible conduit having a longitudinally extending sidewall defining an enclosed inner cavity;
   moving the conduit along a path of travel through a manufacturing station adapted to perform said manufacturing operation;
   periodically operating said manufacturing station to perform said manufacturing operation at a plurality of locations along the length of the conduit;
   positioning an elongated support device within said inner cavity of said flexible conduit and at the manufacturing station to support the sidewall and maintain the integrity of the conduit while the manufacturing operation is being performed, said support device being bent along its length to define at least two offset segments and not being attached to any other structure via the inner cavity; and
   positioning a plurality of mechanical restraints outside of the conduit sidewall, at least one of the restraints acting through the conduit sidewall on each of the support device segments to restrain the axial movement of the support device while allowing said flexible conduit to continue to move through said manufacturing station.

2. The method of claim 1 wherein the manufacturing operation comprises molding a fitting onto the conduit.

3. The method of claim 1 wherein the manufacturing operation comprises embossing visual indicia onto the conduit.

4. The method of claim 1 wherein the manufacturing operation comprises forming an aperture in the sidewall of the conduit.

5. The method of claim 1 wherein the manufacturing operation comprises assembling a nozzle onto the conduit.

6. the method of claim 1 wherein the manufacturing operation comprises molding a fitting onto the conduit and forming an aperture in the sidewall.

7. The method of claim 1 wherein the previously fabricated conduit is a corrugated conduit with a series of spaced annular recesses along its length.

* * * * *